(12) United States Patent
Drahm et al.

(10) Patent No.: US 6,666,098 B2
(45) Date of Patent: Dec. 23, 2003

(54) VIBRATORY TRANSDUCER

(75) Inventors: Wolfgang Drahm, Erding (DE); Alfred Rieder, Landshut (DE); Ennio Bitto, Aesch (CH); Rainer Lorenz, Loerrach (DE); Christian Schütze, Basel (CH); Alfred Wenger, Neftenbach (CH); Michael Fuchs, Eschbach (DE); Martin Anklin, Aesch (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/152,692

(22) Filed: May 23, 2002

(65) Prior Publication Data
US 2002/0174730 A1 Nov. 28, 2002

Related U.S. Application Data
(60) Provisional application No. 60/299,154, filed on Jun. 20, 2001.

(30) Foreign Application Priority Data
May 23, 2001 (EP) ............................................. 01112546

(51) Int. Cl.$^7$ ................................................. G01F 1/84
(52) U.S. Cl. ................................................. 73/861.355
(58) Field of Search ..................... 73/861.355, 861.352, 73/861.357

(56) References Cited

U.S. PATENT DOCUMENTS 6,308,580 B1 * 10/2001 Crisfield et al. ....... 73/861.355
6,415,668 B1 * 7/2002 Cage ..................... 73/861.355

\* cited by examiner

Primary Examiner—Harshad Patel
(74) Attorney, Agent, or Firm—Jones, Tullar & Cooper P.C.

(57) ABSTRACT

A vibratory transducer comprises a flow tube for conducting the fluid flowing in a pipe. The flow tube communicates with the pipe via an inlet-side tube section and an outlet-side tube section. An antivibrator is mechanically connected with the flow tube by an inlet-side coupler and an outlet-side coupler. For driving flow tube and antivibrator at an excitation frequency the transducer comprising an excitation system and for sensing inlet-side and outlet-side vibrations of the flow tube the transducer comprising a sensor system. An internal system formed by the flow tube, the antivibrator, the excitation system, and the sensor system, oscillating about a longitudinal axis of the transducer which is essentially in alignment with the inlet-side tube sections, forces a torsion of the couplers about the longitudinal axis and an essentially torsional elastic deformation of the inlet-side and outlet-side tube sections. The couplers are so dimensioned that an inherent torsion eigenmode of the inlet-side coupler and the inlet-side tube section has a natural frequency approximately equal to the excitation frequency, and an inherent torsion eigenmode of the outlet-side coupler and outlet-side tube section has a natural frequency essentially equal to the natural frequency of the inlet-side inherent torsion eigenmode.

48 Claims, 5 Drawing Sheets

VIBRATORY TRANSDUCER

This application is based on Provisional Application, filed Jun. 20, 2001, as application No. 60/299,154.

FIELD OF THE IINVENTION

This invention relates to a vibratory transducer which is particularly suited for use in a Coriolis mass flowmeter.

BACKGROUND OF THE INVENTION

To determine the mass flow rate of a fluid flowing in a pipe and particularly of a liquid, use is frequently made of measuring devices which induce Coriolis forces in the fluid and derive therefrom a measurement signal representative of mass flow rate by means of a vibratory transducer and control and evaluation electronics connected thereto.

Such transducers and particularly their use in Coriolis mass flow meters have been known and in industrial use for a long time. U.S. Pat. No. 5,549,009, for example, discloses a Coriolis mass flowmeter incorporating a vibratory transducer which responds to the mass flow rate of a fluid flowing in a pipe and comprises:

a curved flow tube for conducting the fluid which vibrates in operation and communicates with the pipe via an inlet-side tube section and an outlet-side tube section.

an antivibrator which extends essentially parallel to and oscillates in a phase opposition to the flow tube and is mechanically connected with the flow tube
by means of at least a first coupler on the inlet side and by means of at least a second coupler on the outlet side;

an excitation system for driving the flow tube and the antivibrator at an excitation frequency; and a sensor system for sensing inlet-side and outlet-side vibrations of the flow tube, wherein a torsional rigidity of the inlet-side tube section and a torsional rigidity of the outlet-side tube section are adapted to one another and to an internal system supported by the two tube sections and formed by at least the flow tube, the antivibrator, the excitation system, and the sensor system such that the internal system is suspended essentially "torsionally soft", i.e., in a torsionally nonrigid manner.

As is well known, vibrating flow tubes, for example U-, V-, or Ω-shaped tubes, if excited into cantilever vibrations in a first natural mode, can cause Coriolis forces in the fluid passing therethrough. In such transducers, the first natural vibration mode chosen for the flow tube is usually the mode in which the flow tube oscillates about a longitudinal axis of the transducer at a lowest natural resonance frequency.

The Coriolis forces thus produced in the fluid result in cantilever vibrations of an at least second natural mode being superimposed on the excited, pendulum-like cantilever vibrations of the so-called useful mode, the vibrations of the second mode being equal in frequency to those of the useful mode. In transducers of the kind described, these cantilever vibrations forced by Coriolis forces, the so-called Coriolis mode, commonly correspond to the natural mode in which the flow tube also performs torsional vibrations about a vertical axis that is perpendicular to the longitudinal axis. As a result of the superposition of the useful and Coriolis modes, the flow tube vibrations sensed on the inlet and outlet sides of the tube by means of the sensor system have a measurable phase difference, which is also dependent on mass flow rate.

Frequently, the flow tubes of such transducers, which are used in Coriolis mass flowmeters, for example, are excited in operation at an instantaneous resonance frequency of the first natural mode, particularly with the vibration amplitude maintained constant. As this resonance frequency is also dependent on the instantaneous density of the fluid in particular, commercially available Coriolis mass flowmeters can also be used to measure the density of moving fluids.

One advantage of a curved tube shape is that thermally induced expansion, particularly in flow tubes with a high expansion coefficient, produce virtually no or only very slight mechanical stresses in the flow tube itself and/or in the connected pipe. Another advantage of curved flow tubes is that the flow tube can be made relatively long, so that high sensitivity of the transducer to the mass flow rate to be measured can be achieved with a relatively short mounting length and relatively low excitation energy. These circumstances permit the flow tube to be made from materials having a high expansion coefficient and/or a high modulus of elasticity, such as special steel.

In vibratory transducers with a straight flow tube, the latter is commonly made from a material having at least a lower expansion coefficient and possibly a lower modulus of elasticity than special steel in order to avoid axial stresses and achieve sufficient measuring sensitivity. Therefore, such straight flow tubes are preferably made of titanium or zirconium, but because of the higher material cost and the generally higher machining cost, such tubes are far more expensive than those made of special steel.

Transducers of the kind disclosed in U.S. Pat. No. 5,549,009, i.e., transducers with a single curved flow tube and with an antivibrator, particularly one extending parallel to the flow tube, have proved especially effective in applications where the fluid to be measured has an essentially constant or only very slightly varying density. For such applications, it is readily possible by means of the antivibrator oscillating in operation at the same frequency as, but in phase opposition to, the flow tube to nearly completely neutralize those transverse forces which were induced in the transducer as a result of alternating lateral motions of the oscillating flow tube, thus virtually keeping such transverse forces away from the connected pipe.

If used for fluids with widely varying densities, such a transducer has practically the same disadvantage as a transducer without an antivibrator, particularly as compared to transducers with two parallel flow tubes.

It turned out that the aforementioned forces produced in the transducer cannot be completely balanced with such an antivibrator. As a result, the above-mentioned internal system, oscillating as a whole about the transducer's longitudinal axis, may also start to vibrate laterally. Accordingly, these lateral vibrations of the internal system force an additional elastic deformation of the inlet-side and outlet-side tube sections and consequently may cause flexural vibrations in the connected pipe. In addition, such lateral vibrations may cause cantilever vibrations very similar to, and thus practically indistinguishable from, the Coriolis mode to be excited in the empty flow tube, and this, in turn, would render the measurement signal that ought to represent the mass flow rate of the fluid unusable.

On the other hand, as is well known, a significant advantage of a single flow tube transducer over a transducer having two parallel flow tubes is that no manifolds are necessary to connect the flow tubes with the pipe. Such manifolds, on the one hand, are expensive to make and, on the other hand, represent flow bodies with a strong tendency to sedimentation or clogging.

One way of reducing density-dependent transverse forces is described, for example, in U.S. Pat. No. 5,287,754 or in U.S. Pat. No. 5,705,754. In the transducers disclosed therein, the transverse forces produced by the vibrating single flow tube, which oscillate at medium or high frequencies, are kept away from the pipe by means of an antivibrator that is heavy compared to the flow tube, and by coupling the flow tube to the pipe relatively loosely, i.e., practically by means of a mechanical low-pass filter. Unfortunately, however, this causes the antivibrator mass required to achieve sufficient damping of the transverse forces to increase disproportionately with the nominal diameter of the flow tube.

This represents a big disadvantage for such transducers, since the use of such massive components always entails both increased assembly costs during manufacture and increased costs during installation of the measuring device in the pipe. In addition, it is difficult to ensure that the lowest natural frequency of the transducer, which decreases with increasing mass, is still far from the likewise rather low natural frequencies of the connected pipe. Thus, use of such a transducer in industrial Coriolis mass flowmeters is limited to relatively small nominal flow tube diameters up to about 10 mm.

SUMMARY OF THE INVENTION

It is therefore an object of the invention to provide a transducer which is particularly suited for a Coriolis mass flowmeter and which in operation, even if it uses only a single straight flow tube, is well balanced dynamically over a wide fluid density range and nevertheless has comparatively little mass.

To attain this object, the invention provides a vibratory transducer for a fluid flowing in a pipe, which comprises:

a curved flow tube for conducting the fluid which vibrates in operation and communicates with the pipe via an inlet-side tube section and an outlet-side tube section;

an antivibrator which in operation oscillates in a phase opposition to the flow tube and is mechanically connected with the flow tube
  by means of a first coupler on the inlet side and
  by means of a second coupler on the outlet side;

an excitation system for vibrating the flow tube and the antivibrator at an excitation frequency; and a sensor system for sensing inlet-side and outlet-side vibrations of the flow tube, wherein an internal system formed by at least the flow tube, the antivibrator, the excitation system, and the sensor system, oscillating about a longitudinal axis of the transducer which is essentially in alignment with the inlet-side tube sections, forces
  a torsion of the first and second couplers about the longitudinal axis and
  an essentially torsional elastic deformation of at least parts of the inlet-side and outlet-side tube sections, and wherein in order to achieve a torsionally soft oscillation of the internal system,
  at least the first coupler, tuned to a torsional rigidity of the inlet-side tube section, and
  at least the second coupler, tuned to a torsional rigidity of the outlet-side tube section, are so dimensioned that
    an inlet-side inherent torsion eigenmode of the first coupler and of the inlet-side tube section has a natural frequency approximately equal to the excitation frequency, and
    an outlet-side inherent torsion eigenmode of the second coupler and of the outlet-side tube section has a natural frequency essentially equal to the natural frequency of the inlet-side inherent torsion eigenmode.

In a first preferred embodiment of the invention, the natural frequency of the inlet-side inherent torsion eigenmode is lower than the excitation frequency.

In a second preferred embodiment of the invention, the antivibrator extends essentially parallel to the flow tube.

In a third preferred embodiment of the invention, the antivibrator has a mass distribution at least similar to that of the flow tube.

In a fourth preferred embodiment of the invention, the antivibrator is tubular in form.

In a fifth preferred embodiment of the invention, the antivibrator is essentially coaxial with the flow tube.

In a sixth preferred embodiment of the invention, the antivibrator is essentially identical in shape to the flow tube.

In a seventh preferred embodiment of the invention, counterbalance bodies are attached to the antivibrator for adjusting the mass distribution of the antivibrator.

In an eighth preferred embodiment of the invention, the antivibrator is heavier than the flow tube.

In a ninth preferred embodiment of the invention, a first rotating-mass counterbalance body is rigidly fixed to the inlet-side tube section to adjust the inlet-side torsion eigenmode, and a second rotating-mass counterbalance body is rigidly fixed to the outlet-side tube section to adjust the outlet-side torsion eigenmode.

In a tenth preferred embodiment of the invention, the transducer comprises a first torsion absorber, which is essentially coaxial with the inlet-side tube section, and a second torsion absorber, which is essentially coaxial with the outlet-side tube section.

In an eleventh preferred embodiment of the invention, the transducer comprises a transducer case fixed to the inlet-side tube section and to the outlet-side tube section and having a lowest natural frequency which is at least 20% above the excitation frequency.

The invention further provides a Coriolis mass flowmeter incorporating a transducer as mentioned above.

A fundamental idea of the invention is to use such torsional vibrations of the internal system suspended in the aforementioned manner, which are rather uncritical for the Coriolis mode and, consequently, for the mass flow rate measurement, and which are caused essentially by in-phase oscillating motions of the flow tube and the multivibrator, to neutralize lateral transverse forces, which are extremely detrimental to the development of the Coriolis mode and, consequently, to the measurement of the mass flow rate. This means that these hitherto undesired torsional vibrations are not merely not damped out but, by being selectively adjusted for their mechanical coupling to the pipe, produced in such a way as to achieve a reduction of interfering effects on the transducer and, thus, an improvement in the transducer's measuring properties.

To accomplish this, according to the invention, an inlet-side torsion vibrator, formed by the inlet-side coupler and the inlet-side tube section, and an outlet-side torsion vibrator, formed by the outlet-side coupler and the outlet-side tube section, are mechanically tuned so as to oscillate practically at resonance with the oscillating internal system. This serves to oscillate the internal system free from external reaction torques if possible, so that the internal system is practically perfectly isolated from the inlet-side and outlet-side tube sections. As a result of this isolation, a total angular momentum of the internal system is practically zero. To the same degree as the total angular momentum, a total lateral momentum of the internal system, and thus transverse forces derived therefrom and transmissible to the outside, are reduced to zero by this isolation.

One advantage of the invention is that the transducer is very well balanced with a relatively small additional amount of mechanical complexity, particularly over a wide fluid density range, regardless of operational variations of an internal total mass.

The transducer according to the invention is further characterized by the fact that the inlet-side and outlet-side tube sections can be kept short, so that the mounting length of the transducer can be substantially reduced while the high quality of the dynamic vibration isolation remains essentially unchanged. Despite its short mounting length, the transducer can be made very light.

BRIEF DESCRIPTION OF THE DRAWINGS

The invention and further advantages will become more apparent by reference to the following description of an embodiment taken in conjunction with the accompanying drawings. Like reference characters have been used to designate like parts throughout the various figures; reference characters already allotted have been omitted in subsequent figures if this contributes to clarity. In the drawings:

FIG. 1b is a axial front side view of the transducer of FIG. 1a;

DETAILED DESCRIPTION OF EXEMPLARY EMBODIMENTS

Figure 1A:
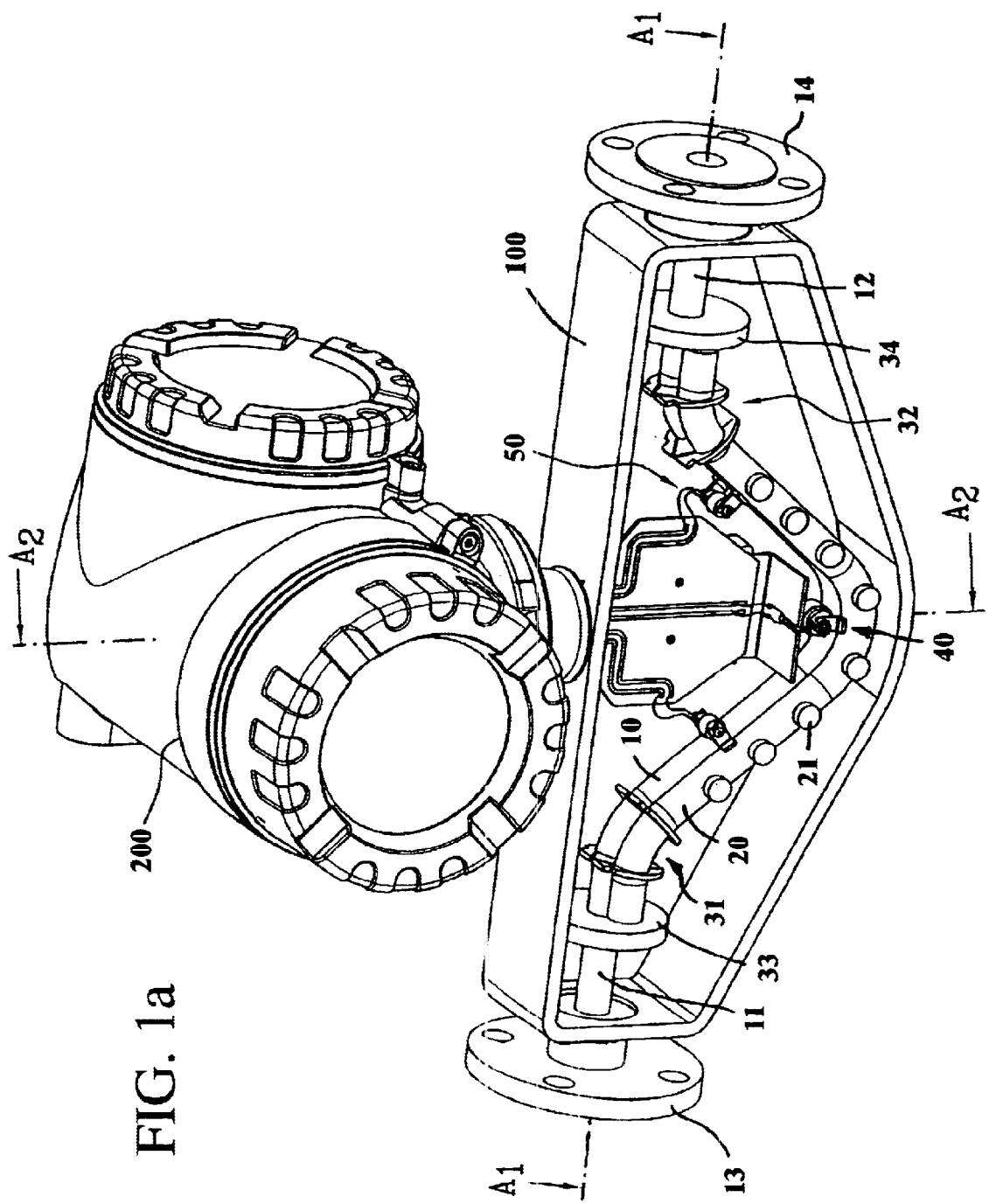
FIG. 1a is a perspective side view of a vibratory transducer.

While the invention is susceptible to various modifications and alternative forms, exemplary embodiments thereof have been shown by way of example in the drawings and will herein be described in detail. It should be understood, however, that there is no intent to limit the invention to the the particular forms diclosed, but on the contrary, the intention is to cover all modifications, equivalents, and alternatives falling within the spirit and scope of the invention as defined by the intended claims.

Figure 1B:
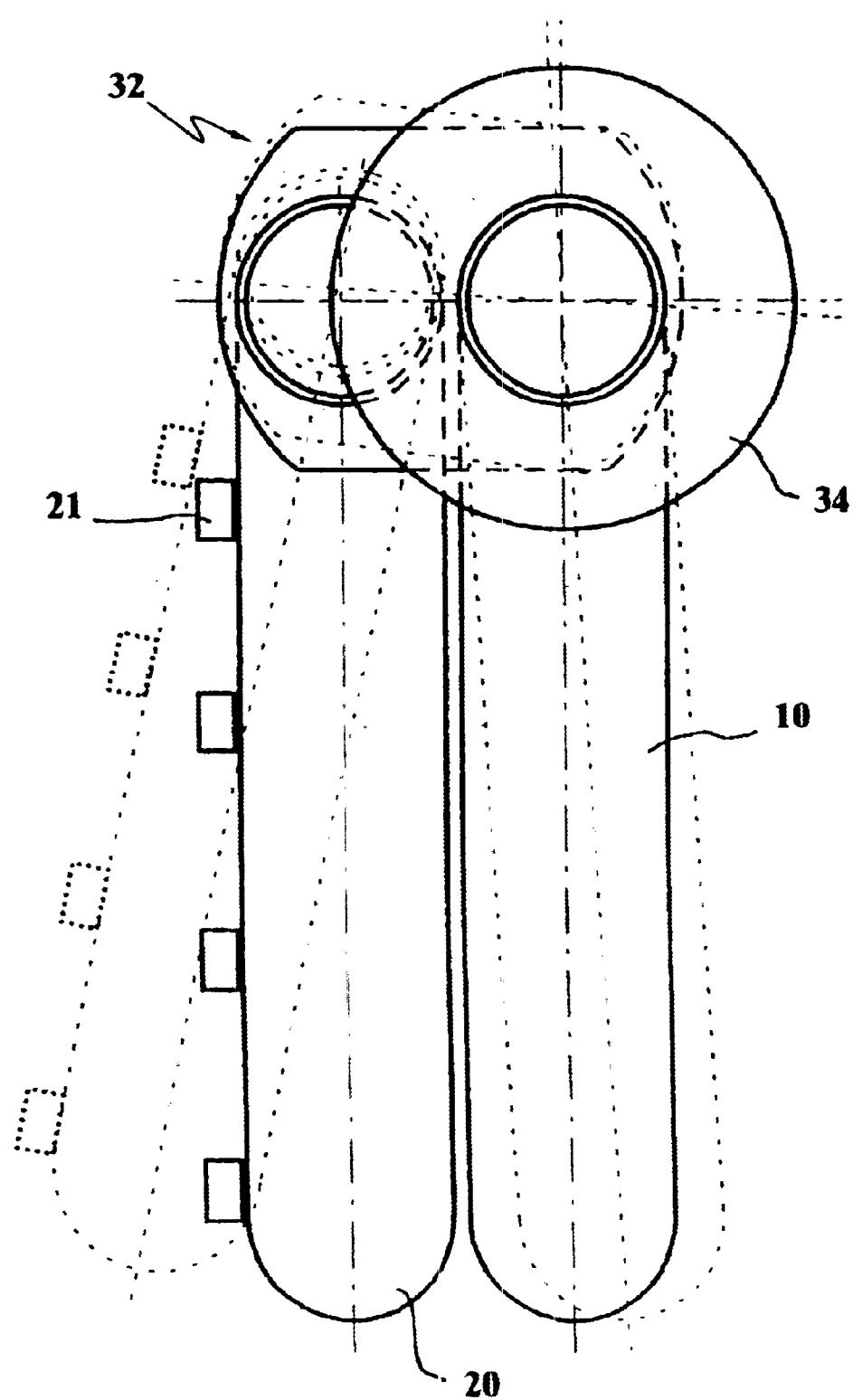

FIGS. 1a and 1b show schematically a meter for moving fluids with a vibratory transducer. The transducer serves to produce in a fluid passing therethrough mechanical reaction forces, such as mass-flow-rate dependent Coriolis forces, density-dependent inertial forces, and/or viscosity-dependent friction forces, which react on the transducer and are measurable, particularly with sensor technology. Derived from these reaction forces, a mass flow rate m, a density ρ, and/or a viscosity η of the fluid, for example, can thus be measured in the manner familiar to those skilled in the art.

To conduct the fluid to be measured, the transducer comprises a curved flow tube 10, particularly a single tube, which is connected via an inlet-side tube section 11 and an outlet-side tube section 12 to a pipe (not shown) that supplies the fluid and carries it away. Flow tube 10, inlet-side tube section 11, and outlet-side tube section 12 are in alignment with each other and with a longitudinal axis $A_1$ and are preferably of one-piece construction, so that they can be made from a single tubular semifinished product, for example; if necessary, flow tube 10, inlet-side tube section 11, and outlet-side tube section 12 may also be made from separate semifinished products that are subsequently joined together, for instance welded together. For flow tube 10, virtually any of the materials commonly used for such transducers, such as steel, Hastelloy, titanium, zirconium, tantalum, etc., may be employed.

For the preferred case where the transducer is to be detachable from the pipe, a first flange 13 is formed on inlet-side section 11 at an inlet end and a second flange 14 is formed on outlet-side tube section 12 at an outlet end; if necessary, inlet-side and outlet-side tube sections 11, 12 may also be connected with the pipe directly, for instance by welding or brazing.

Furthermore, as shown in FIG. 1a, a transducer case 100, for instance a boxlike case or a case in the form of a hollow cylinder, is fixed, preferably rigidly, to the inlet end of inlet-side tube section 11 and to the outlet end of outlet-side tube section 12. Transducer case 100 may also serve to mount an electronics case 200 of the meter.

As shown in FIGS. 1a an 1b, the transducer further comprises an antivibrator 20 for flow tube 10, which antivibrator is fixed to an inlet end of flow tube 10 by means of an inlet-side first coupler 31 and to an outlet end of flow tube 10 by means of an outlet-side second coupler 32 so as to be capable of vibratory motion, the second coupler 32 being preferably identical in shape to the first coupler 31. Coupler 31 may be implemented, for example, with one or, as shown in FIG. 1a, two node plates which are fixed to flow tube 10 and antivibrator 20 at the inlet end; analogously, coupler 32 may be implemented with node plates fixed to flow tube 10 and antivibrator 20 at the outlet end.

The preferably likewise tubular antivibrator 20 is spaced from and extends essentially parallel to flow tube 10. Flow tube 10 and antivibrator 20 are preferably designed to have equal or at least similar mass distributions, particularly mass distributions proportional to each other, while having identical surface shapes if possible. It may also be advantageous, however, to form antivibrator 20 nonidentically to flow tube 10; for instance, antivibrator 20 may be coaxial with flow tube 10 if necessary.

Preferably, antivibrator 20 is made heavier than flow tube 10.

To permit easy adaptation of antivibrator 20 to a mass distribution effective at the flow tube, in a further preferred embodiment of the invention, counterbalance bodies 21 serving as discrete additional masses are mounted, preferably detachably, on antivibrator 20. Counterbalance bodies 21 may be, for example, disks screwed on to staybolts provided on flow tube 10, or short tube sections slipped over the flow tube. Furthermore, a corresponding mass distribution over antivibrator 20 may be implemented by forming longitudinal or annular grooves, for example. A mass distribution suitable for the respective application can be easily determined by the person skilled in the art using the finite element method and/or suitable calibration measurements, for example.

In operation, flow tube 10, as is usual with such vibratory transducers, is excited into cantilever vibrations at an excitation frequency $f_{exc}$ such that the flow tube, oscillating in this so-called useful mode about the transducer's longitudinal axis $A_1$, deflects essentially according to a first natural vibration mode shape. At the same time, antivibrator 20 is so excited into cantilever vibrations as to oscillate in essentially the same mode but in phase opposition to flow tube 10, which is oscillating in the useful mode. In other words, flow tube 10 and antivibrator 20 then move in the manner of vibrating tuning fork tines.

In another preferred embodiment of the invention, the excitation or useful-mode frequency $f_{exc}$ is selected to correspond as exactly as possible to a preferably lowest natural frequency of flow tube 10. If use is made of a flow tube of special steel with a nominal diameter of 29 mm, a wall thickness of about 1.5 mm, a straight length of about 420 mm, and a cord length of 305 mm measured from inlet end to outlet end, the lowest resonance frequency of the tube at zero density is about 490 Hz.

When fluid flows in the pipe, so that the mass flow rate m is nonzero, Coriolis forces are induced by the vibrating flow tube 10 in the fluid passing therethrough. The Coriolis forces react on flow tube 10, thus causing an additional deformation of the flow tube essentially according to a second natural vibration mode shape, this deformation being detectable using sensor technology. An instantaneous form of this so-called Coriolis mode, which is superimposed on and has the same frequency as the excited useful mode, is also dependent on the instantaneous mass flow rate m, particularly with respect to its amplitudes. As is usual with such transducers, the second natural vibration mode may be the antisymmetric twist mode, for example, i.e., the natural mode in which flow tube 10, as mentioned above, also performs torsional vibrations about a vertical axis $A_2$ which is perpendicular to longitudinal axis $A_1$ and lies in a single plane of symmetry of the transducer shown.

To generate mechanical vibrations of flow tube 10, the transducer further comprises an excitation system 40, particularly an electrodynamic system. This excitation system serves to convert electric excitation energy $E_{exc}$ supplied from control electronics (not shown) housed in electronics case 200, for instance with a regulated current and/or a regulated voltage, into an excitation force $F_{exc}$ that acts on flow tube 10, for example in a pulsed manner or harmonically, and deflects the tube in the manner described above. Control electronics suitable for adjusting the excitation energy $E_{exc}$ are disclosed, for example, in U.S. Pat. Nos. 4,777,833, 4,801,897, 4,879,911, or 5,009,109.

As is usual with such transducers, the excitation force $F_{exc}$ may be bidirectional or unidirectional and be adjusted in amplitude, for instance by means of a current- and/or voltage-regulator circuit, and in frequency, for instance by means of a phase-locked loop, in the manner familiar to those skilled in the art. The excitation system may be, for example, a simple solenoid assembly with a cylindrical excitation coil that is mounted on antivibrator 20 and traversed in operation by a suitable excitation current, and with a permanent magnetic armature that is fixed to the outside of flow tube 10, particularly at the midpoint thereof, and rides at least in part in the excitation coil. Excitation system 40 may also be implemented with an electromagnet, for example.

To detect vibrations of flow tube 10, the transducer comprises a sensor system 50. For sensor system 50, virtually any of the sensor systems commonly used for such transducers, which senses motions of flow tube 10, particularly on the inlet and outlet sides, and converts them into corresponding sensor signals, may be employed. Sensor system 50 may be formed, for example, by a first sensor, mounted on flow tube 10 on the inlet side, and a second sensor, mounted on flow tube 10 on the outlet side, in the manner familiar to those skilled in art. The sensors may be electrodynamic velocity sensors, which perform relative vibration measurements, or electrodynamic displacement sensors or acceleration sensors, for example. In place of electrodynamic sensor systems, sensor systems using resistive or piezoelectric strain gages or optoelectronic sensor systems may be used.

If necessary, sensors adapted for the measurement and/or the operation of the transducer may be provided in the manner familiar to those skilled in the art, such as additional vibration sensors mounted on antivibrator 20 and/or transducer case 100, see also U.S. Pat. No. 5,736,653, or temperature sensors mounted on flow tube 10, on antivibrator 20 and/or transducer case 100, see also U.S. Pat. No. 4,68,384 or Published International Application. WO-A 00/102816.

As is readily apparent from the foregoing explanations, antivibrator 20 serves as a support system for excitation system 40 and sensor system 50.

However, antivibrator 20 also serves to dynamically balance the transducer for a predetermined fluid density value, for example a value most frequently expected during operation of the transducer or a particularly critical value, to the point that transverse forces produced in the vibrating flow tube 10 and acting essentially perpendicular to longitudinal and vertical axes $A_1$, $A_2$ are completely offset by counterforces produced by antivibrator 20, cf. U.S. Pat. No. 5,549,009. For a flow tube 10 of special steel and at a vibration amplitude of about 0.03 mm, for example, such transverse forces in flow tube 10, which are produced as a result of mass accelerations when the tube is excited into cantilever vibrations in its first natural vibration mode, would lie in the range of 45 N.

If, however, the aforementioned transverse forces of flow tube 10 are not counterbalanced, as is quite possible in a transducer as disclosed in U.S. Pat. No. 5,549,009, for example, an internal system formed by flow tube 10, antivibrator 20 with any counterbalance bodies 21 attached thereto, excitation system 40, and sensor system 50 and suspended from inlet-side tube section 11 and outlet-side tube section 12, and the couplers 31, 32 fixed to the internal system, will be deflected laterally from an assigned static mounting position. In this manner, the transverse forces may act at least in part via inlet-side and outlet-side tube sections 11, 12 on the connected pipe, thus causing the latter to vibrate as well. Furthermore, such transverse forces, as a result of an unbalanced suspension of the internal system or entire transducer, for instance because of virtually unavoidable manufacturing tolerances, may result in flow tube 10 being additionally excited into cantilever vibrations in a second natural mode, which are then no longer distinguishable from the Coriolis mode proper by means of sensors.

As repeatedly mentioned, flow tube 10 can be dynamically balanced solely by means of antivibrator 20, but only for a single fluid density value, and only for a very narrow fluid density range at best.

If the mass of antivibrator 20, which is preferably identical in shape to flow tube 10, is less than the mass of the fluid-carrying flow tube 10, the vibrating flow tube 10 and antivibrator 20 may additionally perform common oscillating motions about longitudinal axis $A_1$ which, as shown in FIG. 1b, at least with the fluid at rest, are essentially in phase with each other and with the cantilever vibrations of antivibrator 20; if the mass of the fluid-carrying flow tube 10 is less than the mass of antivibrator 20, these common or nonlocal oscillating motions may be in phase with the cantilever vibrations of flow tube 10. In other words, as a result of unbalances, particularly of density-dependent unbalances, between flow tube and antivibrator 20, the entire internal system may perform torsional vibrations about longitudinal axis $A_1$ which are in phase with the cantilever vibrations of flow tube 10 or with those of antivibrator 20.

As a result of these torsional vibrations of the internal system, the two couplers 31, 32, which are virtually rigidly connected with the internal system, are subjected to a corresponding torsion about longitudinal axis $A_1$, i.e., they, too, vibrate, namely in phase with the internal system and with each other. To the same degree, an essentially torsional, elastic deformation of inlet-side and outlet-side sections 11, 12, which are fixed to transducer case 100 and flow tube 10 so as to be capable of vibratory motion, is forced at least in parts thereof.

To the inventors' surprise it turned out that merely by suitably tuning the aforementioned torsion vibrators, namely inlet-side tube section 11 together with coupler 31 and outlet-side tube section 12 together with coupler 32, the transducer can be dynamically balanced virtually independently of the density $\rho$ of the fluid, so that its sensitivity to internally produced transverse forces can be substantially reduced.

To accomplish this, according to the invention, a inlet-side moment of inertia about longitudinal axis $A_1$, here adjusted by means of at least coupler 31, and the torsional rigidity of inlet-side tube section 11 are so adapted to each other that an inlet-side inherent torsion eigenmode, i.e., an eigenmode merely to be computed, of coupler 31 and inlet-side tube section 11 about longitudinal axis $A_1$ has a natural frequency $f_1$ essentially equal to or less than the excitation frequency $f_{exc}$. Furthermore, a outlet-side moment of inertia about longitudinal axis $A_1$, here adjusted by means of at least coupler 32, and the torsional rigidity of outlet-side tube section 12 are so adapted to each other that an outlet-side inherent torsional eigenmode of coupler 32 and outlet-side tube section 12 about longitudinal axis $A_1$ has a natural frequency $f_2$ essentially equal to the natural frequency $f_1$. In the transducer shown in FIG. 1a, the tube segments between the two node plates of coupler 31, which practically do not vibrate, must also be taken into account in the selection of the moment of inertia for adjusting the inlet-side torsion eigenmode; analogously, the tube segments between the two node plates of coupler 32 must be added on to the moment of inertia of the coupler 32 in adjusting the outlet-side torsion eigenmode.

By adjusting the useful mode and the torsion eigenmode in the manner described, the internal system, which in operation oscillates at the same frequency as flow tube 10, which vibrates at the excitation frequency $f_{exc}$, is caused to excite practically exactly the inlet-side and outlet-side torsion eigenmodes. In that case, the torsional vibrations of the internal system are opposed by no or only very small reaction torques of the two torsion vibrators vibrating at their natural frequencies $f_1$ and $f_2$, respectively, and in phase with the internal system. Thus, in operation, the internal system is mounted so "torsionally soft" that it can be regarded as being practically perfectly isolated from inlet-side and outlet-side tube sections 11, 12.

Because of the fact that despite a practically perfect isolation, the internal system oscillates about longitudinal axis $A_1$ and does not rotate, no total annular momentum of the internal system can exist. As a result, however, a total lateral momentum nearly directly dependent on the total annular momentum, particularly with similar mass distributions in flow tube 10 and antivibrator 20, and, consequently, lateral transverse forces derived from this total lateral momentum, which may be transmitted from the internal system to the outside, are also zero. In other words, in the transducer according to the invention, density-dependent unbalances will result nearly exclusively in a change in the instantaneous amplitude of the torsional vibrations of the internal system, but will cause no or only negligibly small displacements of the internal system from its assigned mounting position.

Figure 2:
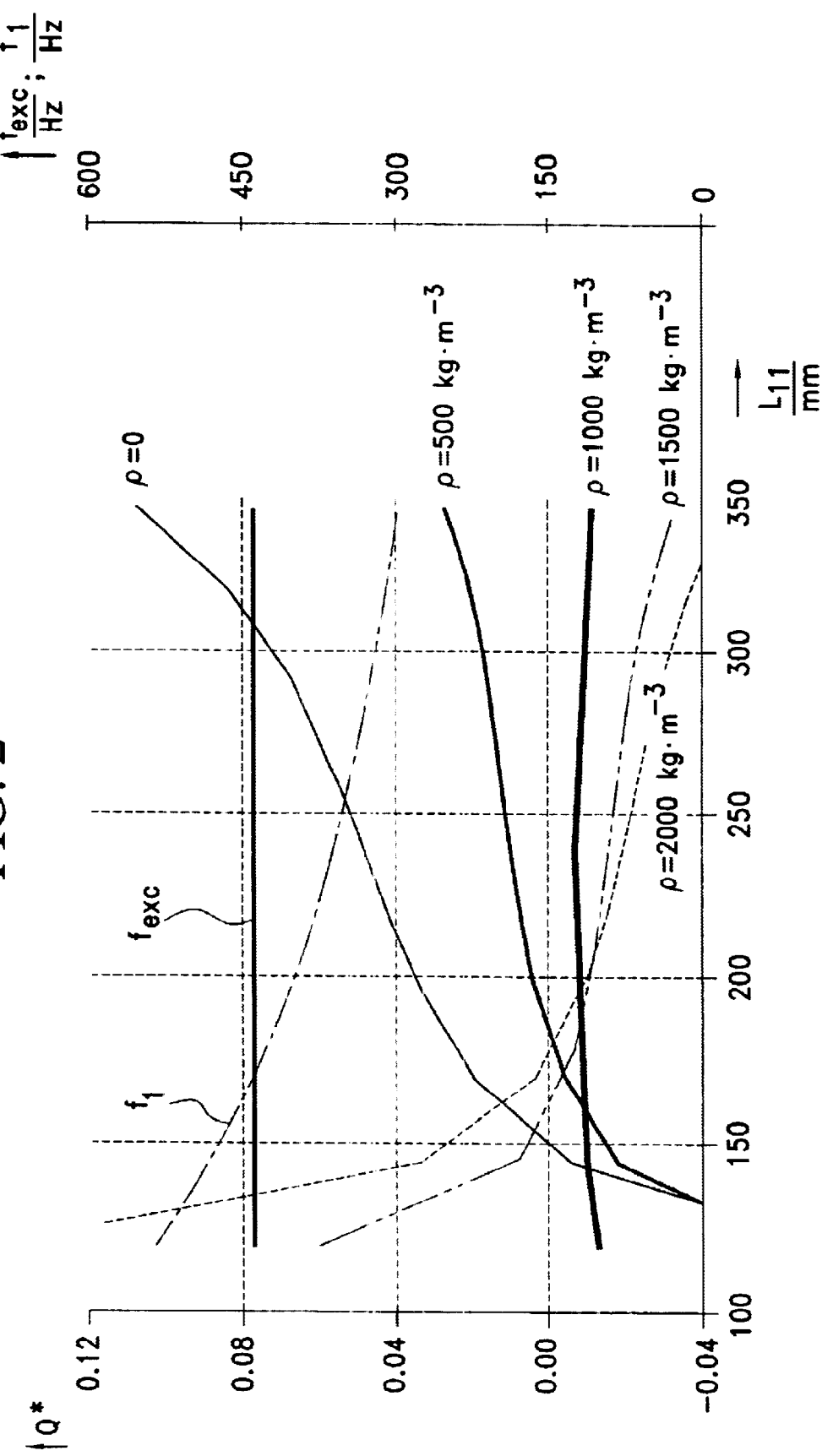
FIG. 2 is a first graphical plot for the transducer of FIGS. 1a1, b.
Figure 3:
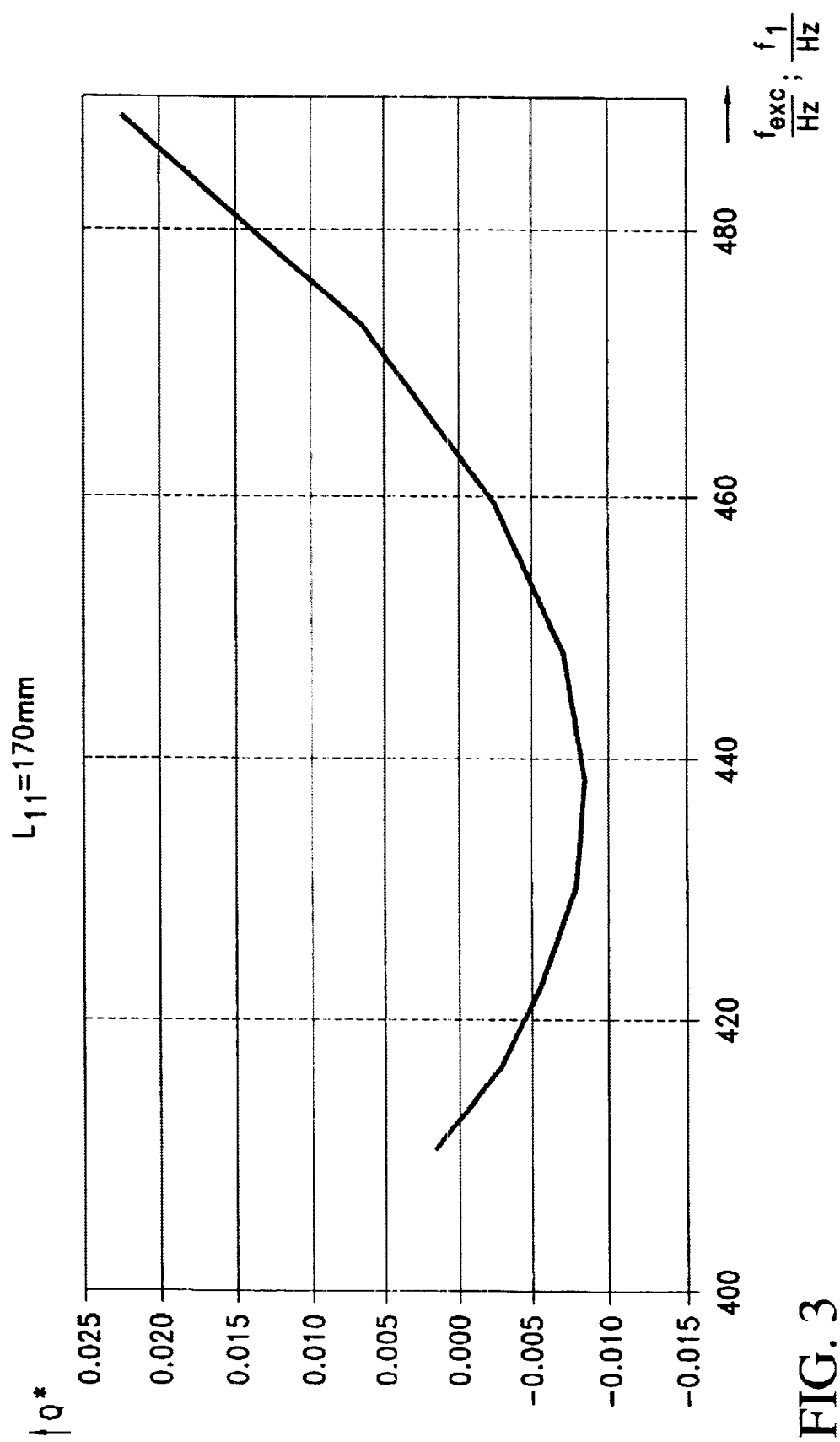
FIG. 3 is a second graphical plot for the transducer of FIGS. 1a, 1b.

Investigations on transducers incorporating the above-described flow tube of special steel have shown that despite a variation of the excitation frequency $f_{exc}$ over a range of about 100 Hz, which is usual with such transducers and corresponds approximately to a fluid density range between 0 and 2000 kg·m$^{-3}$, a maximum transverse force Q* acting on the internal system, normalized to a maximum interior force produced in couplers 31, 32 by the antiphase motions of flow tube 10 and antivibrator 20, can be kept well below 5%, i.e., at about 2 N, see FIGS. 2 and 3.

For this aforementioned case and at a length $L_{11}$ of inlet-side tube section 11 of about 170 mm, for example, that said inlet-side moment of inertia would have to be approximately $1.5 \cdot 10^{-3}$ kg·m$^2$ to set the associated torsion eigenmode at the excitation frequency $f_{exc}$ in the aforementioned manner, cf. FIG. 2. The parameters then to be set on the concrete transducer to optimally adjust the inlet-side and outlet-side torsion eigenmodes to the useful mode, i.e., suitable mass distributions, moments of inertia, torsional rigidities, and geometrical dimensions of flow tube 10, antivibrator 20, inlet-side and outlet-side tube sections 11, 12, and couplers 31, 32, which are derived therefrom, can be determined in the manner familiar to those skilled in the art using the finite element method or other computer-aided simulation computations in conjunction with suitable calibration measurements.

To permit the inlet-side torsion eigenmode to be adjusted as accurately as possible, particularly if the transducer's mounting length is specified, in a further preferred embodiment of the invention, at least a first rotating-mass counterbalance body 33 is rigidly fixed to inlet-side tube section 11, preferably in proximity to coupler 31, and to correspondingly adjust the outlet-side torsion eigenmode, at least a second rotating-mass counterbalance body 34 is rigidly fixed to outlet-side tube section 12, preferably in proximity to coupler 32. Rotating-mass counterbalance bodies 33 and 34 are preferably disks of identical shape and may be mounted on inlet-side tube section 11 and outlet-side tube section 12, respectively, either concentrically as shown in FIGS. 1a, 1b, i.e., with their respective centroids located on longitudinal axis $A_1$, or eccentrically. For the transducer shown, the above-mentioned moment of inertia of $1.5 \cdot 10^{-3}$ kg m$^2$ can thus be implemented in a very simple manner using two rotating-mass counterbalance bodies 33, 34 in the form of annular disks of special steel with a diameter of about 100 mm and a thickness of about 15 mm.

It also turned out that in order to reliably avoid antiphase torsional vibrations of the inlet-side and outlet-side torsion vibrators, an additional, torsionally stiff connection from the two couplers 31, 32 or the two rotating-mass counterbalance bodies 33, 34 to an inner support frame may be advantageous. Furthermore, the excitation frequency $f_{exc}$ should preferably be set at a value not higher than 85% of a lowest natural frequency of transducer case 100, which acts as an external support frame in the above sense.

In a further preferred embodiment of the invention, the transducer comprises an inlet-side first torsion absorber 60 and an outlet-side second torsion absorber (not shown), which is essentially identical in shape to the first torsion absorber 60. The latter serves in particular to suppress torsional moments caused by the oscillating internal system and transmitted via inlet-side tube section 11 to the connected pipe and/or the transducer case 100 fixed at the inlet end.

Torsion absorber 60 is fixed at the inlet end of inlet-side tube section 11 or at least in the vicinity of that end, for instance directly to transducer case 100; analogously, the second torsion absorber, which also serves to avoid torsional moments on the connected pipe and/or the transducer case 100, is attached at the outlet end of outlet-side tube section 12.

Figure 4:
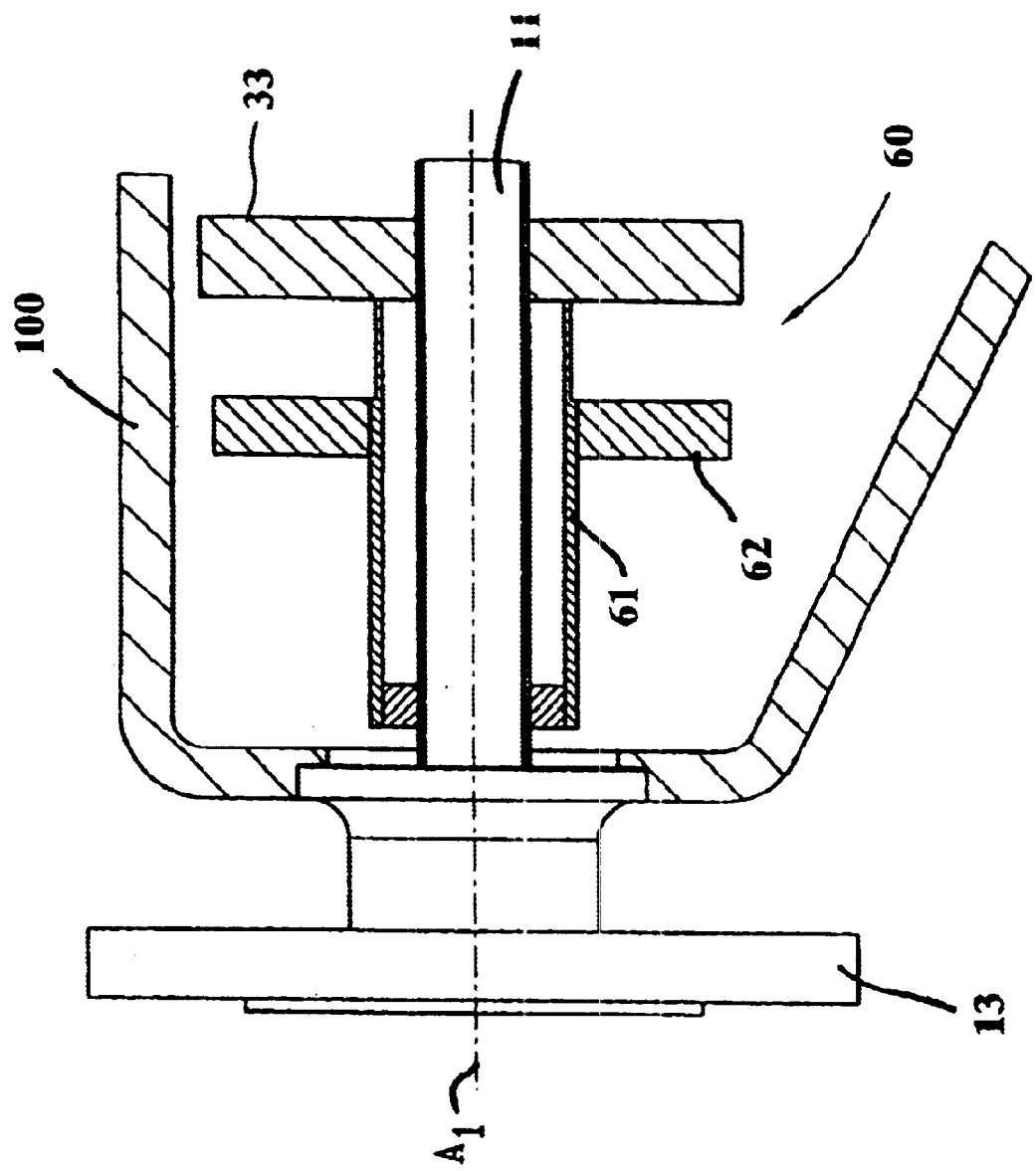
FIG. 4 shows a torsion absorber for the transducer.

As shown in FIG. 4, torsion absorber 60 comprises a torsion spring 61 which is preferably tubular and essentially coaxial with inlet-side tube section 11, and which is fixed to the inlet end so as to be capable of torsional vibration, i.e., of being twisted at least in sections with respect to inlet-side tube section 11. Furthermore, torsion absorber 60 comprises a preferably disk-shaped rotating-mass body 62 attached to the torsion spring on the side remote from the inlet end of inlet-side tube section 11. Torsion spring 61 and rotating-mass body 62 are so adapted to each other that torsion absorber 60, excited in operation by the twisting inlet-side tube section 11 and/or by the likewise slightly deforming transducer case 100 into torsional vibrations about longitudinal axis $A_1$, vibrates out of phase with respect to, and particularly in phase opposition to, the above-mentioned inlet-side torsion vibrator, consisting of coupler 31 and inlet-side tube section 11. To support the excitation of torsion absorber 60, torsion spring 61 may advantageously be extended up to rotating-mass counterbalance body 33, if present, or up to coupler 31, and fixed to one of the two, for example fixed to the rotating-mass counterbalance body 33, as shown in FIG. 4. This also serves to reduce lateral flexural vibrations of torsion absorber 60.

Because of its good dynamic balance even at varying densities ρ of the fluid passing through it, the transducer according to the invention is particularly suited for use in a Coriolis flowmeter, a Coriolis mass flowmeter-densimeter, or a Coriolis mass flowmeter-densimeter-viscometer.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A vibratory transducer for a fluid flowing in a pipe, said vibratory transducer defining a longitudinal axis and comprising:
   a curved flow tube for conducting the fluid, which vibrates in operation and communicates with the pipe via an inlet-side tube section and an outlet-side tube section of said curved flow tube;
   an antivibrator which in operation oscillates in a phase opposition to that of said curved flow tube and is mechanically connected with said curved flow tube by means of a first coupler on the inlet-side tube section and by means of a second coupler on the outlet-side tube section of said curved flow tube;
   an excitation system for vibrating said curved flow tube and said antivibrator at an excitation frequency; and
   a sensor system for sensing vibrations at said inlet-side tube section and said outlet-side tube section of said curved flow tube, wherein:
   an internal system formed by at least said curved flow tube, said antivibrator, said excitation system, and said sensor system, oscillating about said longitudinal axis of the transducer which is essentially in alignment with the inlet-side tube section, forces a torsion of said first and said second couplers about said longitudinal axis and an essentially torsional elastic deformation of at least parts of said inlet-side tube section and said outlet-side tube section; and
   in order to achieve a torsionally soft oscillation of said internal system, at least said first coupler, tuned to a torsional rigidity of said inlet-side tube section, and at least said second coupler, tuned to a torsional rigidity of said outlet-side tube section, are so dimensioned that an inlet-side inherent torsion eigenmode of said first coupler and of said inlet-side tube section has a natural frequency approximately equal to the excitation frequency, and an outlet-side inherent torsion eigenmode of said second coupler and of said outlet-side tube section has a natural frequency essentially equal to the natural frequency of said inlet-side inherent torsion eigenmode.

2. The transducer as claimed in claim 1, wherein the natural frequency of said inlet-side inherent torsion eigenmode is lower than the excitation frequency.

3. The transducer as claimed in claim 1, wherein said antivibrator extends essentially parallel to said flow tube.

4. The transducer as claimed in claim 1, wherein said antivibrator has a mass distribution at least similar to that of said flow tube.

5. The transducer as claimed in claim 1, wherein said antivibrator is tubular in form.

6. The transducer as claimed in claim 1, wherein said antivibrator is essentially coaxial with said flow tube.

7. The transducer as claimed in claim 1, wherein said antivibrator is essentially identical in shape to said flow tube.

8. The transducer as claimed in claim 1, wherein counterbalance bodies are attached to said antivibrator for adjusting the mass distribution of said antivibrator.

9. The transducer as claimed in claim 1, wherein said antivibrator is heavier than said flow tube.

10. The transducer as claimed in claim 1, wherein a first rotating-mass counterbalance body is rigidly fixed to said inlet-side tube section to adjust the inlet-side torsion eigenmode, and a second rotating-mass counterbalance body is rigidly fixed to said outlet-side tube section to adjust the outlet-side torsion eigenmode.

11. The transducer as claimed in claim 1, further comprising:
   a first torsion absorber, which is essentially coaxial with said inlet-side tube section, and a second torsion absorber, which is essentially coaxial with said outlet-side tube section.

12. The transducer as claimed in claim 1, further comprising:
   a transducer case fixed to said inlet-side tube section and to said outlet-side tube section and having a lowest natural frequency which is at least 20% above the excitation frequency.

13. A Coriolis mass flowmeter incorporating a transducer as claimed in claim 1.

14. The transducer as claimed in claim 1, further comprising:
   a transducer case fixed to an inlet end of said inlet-side tube section and an outlet end of said outlet-side tube section.

15. A vibratory transducer for a fluid flowing in a pipe, said vibratory transducer defining a longitudinal axis and including:
   a transducer case; and
   an internal system, said internal system being suspended within said transducer case by means of an inlet-side tube section and an outlet-side tube section, wherein said inlet-side tube section and said outlet-side tube section are essentially in alignment with each other and with said longitudinal axis of the transducer, said internal system comprising:
- a flow tube for conducting the fluid, said flow tube communicating with the pipe via said inlet-side tube section and said outlet-side tube section;
- an antivibrator mechanically connected with said flow tube by means of an inlet-side first coupler and by means of an outlet-side second coupler;
- an excitation system for vibrating said flow tube at an excitation frequency; and
- a sensor system for sensing vibrations of said flow tube, wherein:
  - at least temporary said flow tube and said antivibrator oscillate essentially about said longitudinal axis of the transducer such that a torsion of said first and second couplers about said longitudinal axis and an essentially torsional elastic deformation of at least parts of said inlet-side and outlet-side tube sections are forced; and
  - at least said first coupler, tuned to a torsional rigidity of said inlet-side tube section, and at least said second coupler, tuned to a torsional rigidity of said outlet-side tube section, are so dimensioned that an inlet-side inherent torsion eigenmode of said first coupler and of said inlet-side tube section has a natural frequency approximately equal to the excitation frequency, and an outlet-side inherent torsion eigenmode of said second coupler and of said outlet-side tube section has a natural frequency essentially equal to the natural frequency of the inlet-side inherent torsion eigenmode.

16. The transducer as claimed in claim 15, wherein the natural frequency of the inlet-side inherent torsion eigenmode is lower than the excitation frequency.

17. The transducer as claimed in claim 15, wherein said flow tube performs cantilever vibrations.

18. The transducer as claimed in claim 15, wherein said antivibrator extends essentially parallel to said flow tube.

19. The transducer as claimed in claim 15, wherein said antivibrator has a mass distribution at least similar to that of said flow tube.

20. The transducer as claimed in claim 15, wherein said antivibrator is tubular in form.

21. The transducer as claimed in claim 15, wherein said antivibrator is essentially coaxial with said flow tube.

22. The transducer as claimed in claim 15, wherein said antivibrator is essentially identical in shape to said flow tube.

23. The transducer as claimed in claim 15, wherein counterbalance bodies are attached to said antivibrator for adjusting the mass distribution of said antivibrator.

24. The transducer as claimed in claim 15, wherein said antivibrator is heavier than said flow tube.

25. The transducer as claimed in claim 15, wherein a first rotating-mass counterbalance body is rigidly fixed to the inlet-side tube section to adjust the inlet-side torsion eigenmode, and a second rotating-mass counterbalance body is rigidly fixed to the outlet-side tube section to adjust the outlet-side torsion eigenmode.

26. The transducer as claimed in claim 15, further comprising:
- a first torsion absorber, which is essentially coaxial with said inlet-side tube section, and a second torsion absorber, which is essentially coaxial with said outlet-side tube section.

27. The transducer as claimed in claim 15, wherein said transducer case has a lowest natural frequency which is at least 20% above the excitation frequency.

28. A Coriolis mass flowmeter incorporating a transducer as claimed in claim 15.

29. A vibratory transducer for a fluid flowing in a pipe, said vibratory transducer defining a longitudinal axis and including:
- a transducer case; and
- an internal system being suspended within said transducer case by means of an inlet-side torsion vibrator and an outlet-side torsion vibrator, each of said torsion vibrators comprising a tube section fixed to said transducer case and a coupler fixed to said tube section spaced apart from said transducer case, wherein the tube section of said inlet-side torsion vibrator and the tube section of said outlet-side torsion vibrator are essentially in alignment with each other and with said longitudinal axis of the transducer, and said internal system comprising:
  - a flow tube for conducting the fluid, said flow tube communicating with the pipe via the tube section of said inlet-side torsion vibrator and via the tube section of said outlet-side torsion vibrator;
  - an antivibrator mechanically connected with said flow tube by means of the coupler of said inlet-side torsion vibrator and by means of the coupler of said outlet-side torsion vibrator;
  - an excitation system for vibrating said flow tube at an excitation frequency; and
  - a sensor system for sensing vibrations of said flow tube, wherein:
    - at least temporary the internal system and said torsion vibrators oscillate essentially about said longitudinal axis of the transducer such that a torsion of the couplers of said torsion vibrators about said longitudinal axis and an essentially torsional elastic deformation of at least parts of the tube sections of said torsion vibrators are forced; and
    - an inherent torsion eigenmode of said inlet-side torsion vibrator has a natural frequency approximately equal to the excitation frequency, and an inherent torsion eigenmode of said outlet-side torsion vibrator has a natural frequency essentially equal to the natural frequency of said torsion eigenmode of the inlet-side torsion vibrator.

30. The transducer as claimed in claim 29, wherein the natural frequency of the inlet-side inherent torsion eigenmode is lower than the excitation frequency.

31. The transducer as claimed in claim 29, wherein said flow tube performs cantilever vibrations.

32. The transducer as claimed in claim 29, wherein said antivibrator extends essentially parallel to said flow tube.

33. The transducer as claimed in claim 29, wherein said antivibrator has a mass distribution at least similar to that of said flow tube.

34. The transducer as claimed in claim 29, wherein said antivibrator is tubular in form.

35. The transducer as claimed in claim 29, wherein said antivibrator is essentially coaxial with said flow tube.

36. The transducer as claimed in claim 29, wherein said antivibrator is essentially identical in shape to said flow tube.

37. The transducer as claimed in claim 29, wherein counterbalance bodies are attached to said antivibrator for adjusting the mass distribution of said antivibrator.

38. The transducer as claimed in claim 29, wherein said antivibrator is heavier than said flow tube.

39. The transducer as claimed in claim 29, wherein a first rotating-mass counterbalance body is rigidly fixed to said inlet-side tube section to adjust the inlet-side torsion eigenmode, and a second rotating-mass counterbalance body is rigidly fixed to said outlet-side tube section to adjust the outlet-side torsion eigenmode.

40. The transducer as claimed in claim 29, further comprising:
a first torsion absorber, which is essentially coaxial with said inlet-side tube section, and a second torsion absorber, which is essentially coaxial with said outlet-side tube section.

41. The transducer as claimed in claim 29, wherein the transducer case has a lowest natural frequency which is at least 20% above the excitation frequency.

42. A Coriolis mass flowmeter incorporating a transducer as claimed in claim 29.

43. A method of operating a vibratory transducer for measuring a fluid flowing in a pipe, the transducer comprising a transducer case and an internal system, the internal system being suspended within the transducer case by means of an inlet-side torsion vibrator and an outlet-side torsion vibrator, wherein each of the torsion vibrators comprises: a tube section fixed to the transducer case and a coupler fixed to the tube section spaced apart from the transducer case; the tube section of the inlet-side torsion vibrator and the tube section of the outlet-side torsion vibrator are essentially in alignment with each other and with a longitudinal axis of the transducer, and wherein the internal system comprises: a flow tube for conducting the fluid; the flow tube communicating with the pipe via the tube section of the inlet-side torsion vibrator and via the tube section of the outlet-side torsion vibrator; an antivibrator mechanically connected with the flow tube by means of the coupler of the inlet-side torsion vibrator and by means of the coupler of the outlet-side torsion vibrator; an excitation system for vibrating the flow tube; and a sensor system for sensing vibrations of the flow tube; the method comprising the steps of:
vibrating the flow tube at an excitation frequency; and
causing both the internal system and the two torsion vibrators to oscillate essentially about said longitudinal axis of the transducer at an oscillation frequency being essentially equal to a natural frequency of an inherent torsion eigenmode of the inlet-side torsion vibrator and being essentially equal to a natural frequency of an inherent torsion eigenmode of the outlet-side torsion vibrator.

44. The method as claimed in claim 43, wherein the step of vibrating the flow tube comprises a step of deflecting the flow tube according to a natural vibration mode shape.

45. The method as claimed in claim 43, wherein the step of vibrating the flow tube comprises a step of selecting said excitation frequency to correspond to a natural frequency of the flow tube.

46. The method as claimed in claim 43, wherein the step of vibrating the flow tube comprises a step of exciting the flow tube into cantilever vibrations such that the flow tube oscillates about said longitudinal axis of the transducer.

47. The method as claimed in claim 43, further comprising a step of vibrating the antivibrator.

48. The method as claimed in claim 43, further comprising a step of vibrating the antivibrator in a phase opposition to the flow tube.

* * * * *